US007747742B2

(12) United States Patent
Liu et al.

(10) Patent No.: US 7,747,742 B2
(45) Date of Patent: Jun. 29, 2010

(54) ONLINE PREDICATE CHECKING FOR DISTRIBUTED SYSTEMS

(75) Inventors: Xuezheng Liu, Beijing (CN); Zheng Zhang, Beijing (CN); Jian Tang, Beijing (CN); Zhenyu Guo, Beijing (CN); Ming Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 12/163,671

(22) Filed: Jun. 27, 2008

(65) Prior Publication Data

US 2009/0327458 A1 Dec. 31, 2009

(51) Int. Cl.
*G06F 15/173* (2006.01)
(52) U.S. Cl. .................... 709/224; 709/201; 709/222
(58) Field of Classification Search .............. 709/201, 709/222, 224
See application file for complete search history.

(56) References Cited

U.S. PATENT DOCUMENTS

| 5,794,046 | A | 8/1998 | Meier et al. | |
|---|---|---|---|---|
| 5,809,238 | A * | 9/1998 | Greenblatt et al. | 709/202 |
| 5,933,639 | A | 8/1999 | Meier et al. | |
| 6,169,989 | B1 * | 1/2001 | Eichstaedt et al. | 707/100 |
| 6,505,246 | B1 * | 1/2003 | Land et al. | 709/224 |
| 6,658,471 | B1 * | 12/2003 | Berry et al. | 709/224 |
| 6,961,926 | B2 | 11/2005 | Koyama | |
| 7,058,928 | B2 | 6/2006 | Wygodny et al. | |
| 7,133,820 | B2 | 11/2006 | Pennello et al. | |
| 7,143,392 | B2 | 11/2006 | Ii et al. | |
| 7,162,721 | B2 | 1/2007 | Ali et al. | |
| 2002/0174415 | A1 | 11/2002 | Hines | |
| 2005/0268326 | A1 | 12/2005 | Bhargavan et al. | |

OTHER PUBLICATIONS

Aguilera, et al., "Performance Debugging for Distributed Systems of Black Boxes", at <<http://www.hpl.hp.com/personal/Marcos_Aguilera/papers/blackbox-sosp2003.pdf>>, ACM, 2003, pp. 74-89.
Baah, et al., "On-line Anomaly Detection of Deployed Software: A Statistical Machine Learning Approach", at <<http://www.cc.gatech.edu/aristotle/pdffiles/116Baah.pdf>>, ACM, 2006, pp. 8.
Fox, "Event-Predicate Detection in the Monitoring of Distributed Applications", at <<http://citeseer.ist.psu.edu/cache/papers/cs/26582/http:zSzzSzwww.shoshin.uwaterloo.caz$zpublicationszSzpszSzmrfox.pdf/fox98eventpredicate.pdf>>, Mark Robert Fox, 1998, pp. 120.
Khanna, et al., "Automated Online Monitoring of Distributed Applications through External Monitors", available at least as early as Nov. 16, 2007, at >>http://cobweb.ecn.purdue.edu/~dcsl/publications/papers/2006/monitor_TDSC_accepted.pdf>>, pp. 37.

* cited by examiner

*Primary Examiner*—Michael Won
(74) *Attorney, Agent, or Firm*—Lee & Hayes, PLLC

(57) ABSTRACT

Exemplary methods, computer-readable media, and systems describe detecting a performance bug or a nontrivial correctness in a distributed system. The techniques describe using an online predicate checker by specifying a predicate on distributed properties of the distributed system. The process describes monitoring and checking the predicate when the system is deployed and providing a service. In response to detection of the performance bug, the process describes performing modifications of the predicate or installing new predicate.

18 Claims, 5 Drawing Sheets

ONLINE PREDICATE CHECKING FOR DISTRIBUTED SYSTEMS

TECHNICAL FIELD

The subject matter relates generally to debugging, and more specifically, to detecting non-trivial correctness and performance bugs for distributed systems.

BACKGROUND

Distributed systems may be difficult to develop, to test, and to debug. There are conditions for bugs to manifest, such as user requests, service loads, hardware resources, and system scale, that are typically hard to replicate in a test environment. As a result, testing and debugging in a test-lab leave many undetected bugs that only surface when a system is brought online.

Traditional bug-finding approaches mainly focus on pre-shipped systems. For example, model-checkers control the input and virtualizes environments in which a system is running to systematically explore the system space and check a predicate violation to spot a bug site. A problem of state explosion often limits the testing scale to be depressingly small compared to the deployed system. Similarly, the environment is much more simplified. The testing could not possibly identify performance bugs as this requires a real environment and load requests.

Another problem is after the system is deployed, undetected bugs usually occur, either violating correctness properties or degrading performance. Catching these bugs and finding out root causes are challenging for these particular conditions, because there is no bug checking facility as in controlled test-labs. Thus, there are deficiencies with existing debugging tools.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary systems, methods, and computer program products for detecting performance bugs in a deployed distributed system. The process creates an online predicate checker by specifying predicates on distributed properties of the system. The predicate checker evaluates the system when the system is deployed and providing a service. The process detects for a non-trivial correctness and a performance bug by looking for violations of the predicates. Upon finding violations, the process includes performing modifications of the predicates or installing new predicates in response.

This online predicate checker allows for flexibility to change the predicates or to install new predicates without shutting down the system. Furthermore, there is improved efficiency of preserving consistent snapshots for correct online predicate evaluation and for handling failures.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to a non-trivial correctness and a performance bug online detection, and is shown and described in the context of detecting violations of predicates in a distributed system in a reliable and efficient manner. This disclosure describes detection during deployment in a distributed system by a predicate checker model. The monitoring of the predicate adds minimal additional performance overhead to the network, as continuous monitoring is suggested, and minimal costs to make the process feasible. The focus of the online predicate checker is to make runtime checking easier and feasible for deployed and large-scale distributed networks.

The online predicate checker allows developers to specify complex predicates that involve distributed properties that are calculated from states in multiple machines for deployed systems. The distributed properties to check include correctness or performance issues. Furthermore, the process uses sequential programs, which specifies the predicate in a simple and sequential programming style.

The performance bugs are detected immediately when there is a violation of the predicate, indicating performance issues. As a result, comprehensive information is automatically collected for understanding root causes. Thus, the performance bugs that are detected are identified to ensure that the applications and the services used in the distributed network, are working properly and with good performance.

The performance bug detections described herein are not limited to any particular application or deployed systems, but may be applied to many contexts and environments. By way of example and not limitation, the online predicate checker may be employed in a distributed storage system, a consensus service used in production, a Web search engine, a DHT implementation, a peer to peer file distribution system, and the like.

Exemplary Environment for Online Predicate Checker

The following discussion of an exemplary operating environment provides the reader with assistance in understanding ways in which various subject matter aspects of the system, methods, and computer program products may be employed. The environment described below constitutes an example and is not intended to limit application of the subject matter to any one particular operating environment.

Figure 1:
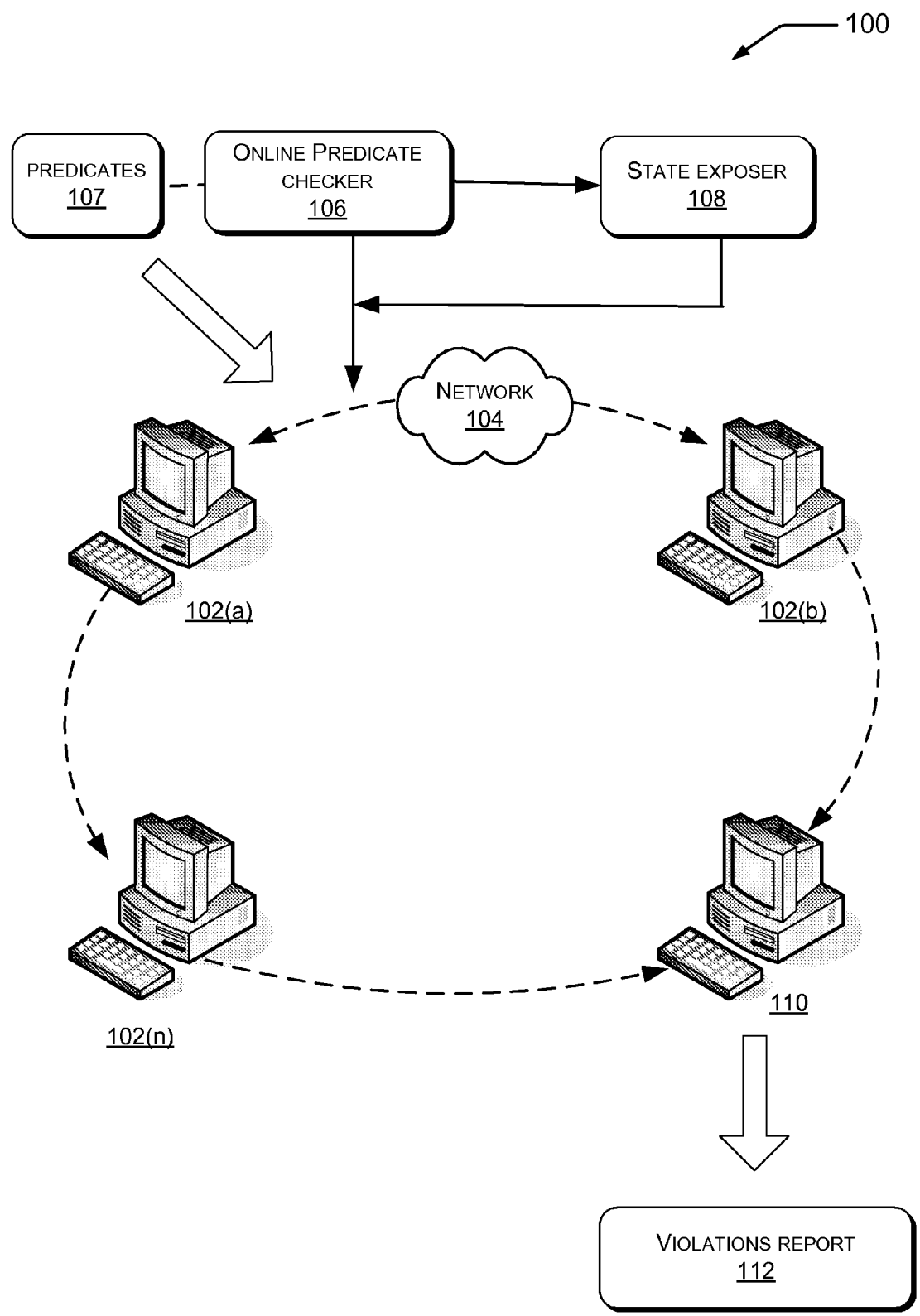
FIG. 1 is a block diagram of an exemplary online predicate checker.

FIG. 1 is an overview block diagram of an exemplary environment 100 for an online predicate checker. Shown are computing devices 102 in a distributed system 102(a) . . . 102(n). Computing devices 102 that are suitable for use with the environment 100, include, but are not limited to, a personal computer, a laptop computer, a desktop computer, a workstation computer, a personal digital assistance, a cellular phone, a writing tablet, and the like. These various types of computing devices 102 enable a user to conduct an activity in the distributed system, such as running applications, accessing files, managing databases, retrieving email, using a calendar, using network resources, sharing folders, and the like. The environment 100 includes a network 104 to connect users and resources in the distributed system.

The environment 100 may include an online predicate checker including but not limited to, a tool, a method, a solver, software, an application program, a service, technology resources which includes access to the network 104, internet, and the like. Here, the online predicate checker is implemented as an application program 106. For convenience and ease of reading, the term "online predicate checker" may be used interchangeably with the term "online predicate model". The term "distributed system" may be used interchangeably with the term "distributed network".

The online predicate checker application program 106 defines online checking by allowing developers to specify a predicate 107 on properties of the distributed system. Then the online predicate checker 106 identifies dataflow, types of states, how states are retrieved, a logic, and a mapping function in each stage for a predicate. The online predicate checker application program 106 monitors whether an abnormal condition occurred on the distributed system when the system is deployed and the system is providing an actual service. The process detects a non-trivial correctness or a performance bug when the predicate is violated. The detection means a desired course of action did not occur, but rather causing a violation of correctness properties or degrading performance in the distributed system.

The online predicate checker application program 106 preserves consistent snapshots for correct predicate evaluation and handles failures. Also, the online predicate checker application program 106 conducts parallelism by expressing predicates as a dataflow graph, allowing for efficient parallel and pipelined implementation. More discussion of the dataflow graph follows in FIG. 3.

The online predicate checker application program 106 includes a programming abstract that hides away details of collecting and aligning states, and allows predicates to be programmed in a straightforward sequential programming style. An advantage is the online predicate checker application program 106 supports legacy systems transparently, requiring neither modification nor recompilation of the source code. Another benefit is the process is scalable for checking large-scale distributed systems. The online predicate checker application program 106 is fault tolerant for failures in both the checked distributed system and the checker 106 itself.

FIG. 1 illustrates a state exposer 108, which is a client-side agent of the online predicate checker application program 106. The state exposer 108 is responsible to observe states required for predicate evaluation over a checked system.

A binary instrumentation is used to inject the state exposer 108 (a binary module) to the checked system, so that legacy systems are transparently supported. When an instrumented function is called, a callback in the state exposer 108 is triggered to retrieve runtime states. Developers can use an emit API to instruct when and what states are to be exposed. However, in many cases this is done automatically. For distributed systems coded in an event-driven style, event handlers are usually where state transition happens, and contain any important states in the parameters. Therefore, the state exposer 108 uses symbol information to automatically expose the parameters in event handlers, so that no extra exposing code is required.

The state exposer 108 collectively has all of the states, but some of the states may not be used in the predicates. The online predicate checker application program 106 transmits the states required by the predicates, and silently omits the rest. This design decouples state exposing and predicate specification, in order to have flexibility to install and to change predicates in the middle of a system execution, without bringing down the checked system to inject a changed state exposer 108.

Besides exposing states, the binary-injection to the checked system also implements a Lamport clock. This clock is understood by a person of ordinary skill in the art. Thus, exposed states may bear a logic timestamp that expresses a happens-before relationship. This timestamp is used when checking the predicates.

Shown in FIG. 1 is a verifier 110 which collects states that are transmitted from the state exposer 108 and evaluates predicates. The computing devices that run verifiers 110 can be either dedicated machines, or those running the checked system. In the distributed system, states from different nodes can arrive at the verifiers 110 in an arbitrary order. With a logic timestamp in exposed states, verifiers 110 are able to align the received states to construct consistent snapshots for checking the system.

The verifier 110 outputs a performance bug report, a Violations Report 112. The Violations Report 112 includes comprehensive information about the particular predicate instance and the related states. Furthermore, the Violations Report 112 may include replay-enabling logs.

The environment 100 uses a reliable network transmission between the state exposer 108 and the verifier 110, and among other verifiers when there are multiple levels. When a verifier 110 fails, there are other verifiers to take over the uncovered portion in a key space. A central master machine manages key space partition and detects failures of the verifiers. Each verifier periodically reports own recently verified timestamp to master. The verifier is considered to fail when the verifier cannot make progress before timeout. In such cases, the master rearranges a partition of key space to make sure that every key is appropriately covered. The new partition is then broadcast to all related state exposers and verifiers. By this means, the appropriate states may arrive at the new destinations.

The online predicate checker application program 106 uses a failure detector for the checked processes. This occurs before the failure detector may safely claim that some process is dead. The online predicate checker application program 106 has to wait for the states from this process. This waiting time, $T_{Buf}$ is needed by the verifier to buffer states from different state exposers in order to check against a consistent snapshot. A larger $T_{Buf}$ indicates a larger buffer size and delayed violation detection, while if $T_{Buf}$ is set too low, there is a risk of having too many imprecise results due to incorrect selection for the process. $T_{Buf}$ thus yields a knob to control a tradeoff between performance and accuracy.

Exemplary Detection of a Bug Using Online Predicate Checker

Figure 2:
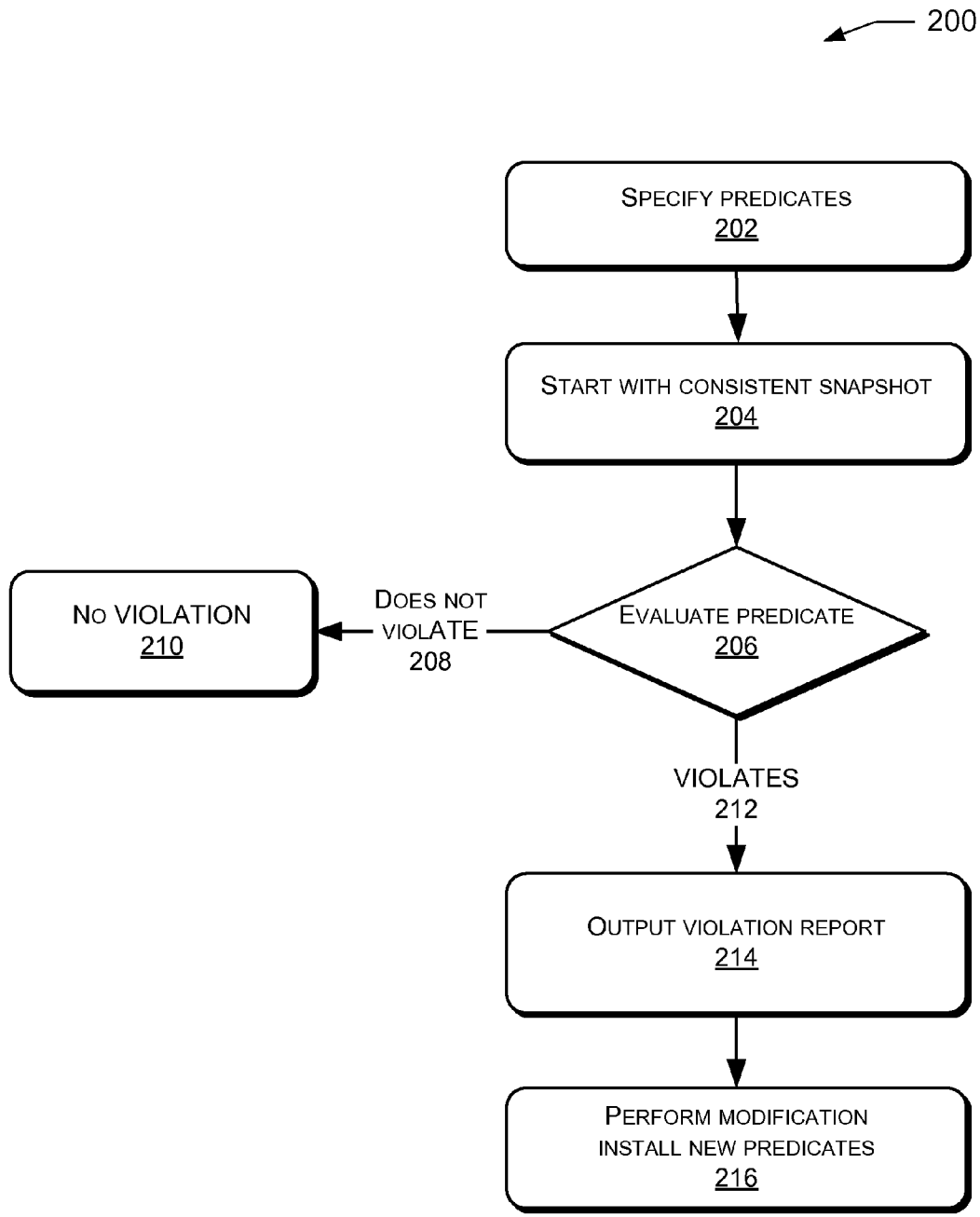
FIG. 2 is a flowchart of an exemplary process for detecting a performance bug online using predicates.

FIG. 2 is an overview flowchart of exemplary process of the online predicate checker for detecting the performance bug or the non-trivial correctness in 200. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps may be omitted.

In block 202, the process 200 assumes the online predicate checker application program 106 has been developed for programs and services on the distributed system. As a result, the online predicate checker application program 106 allows developers to specify complex predicates on distributed properties of the systems.

Block 204 represents the debugging process by starting with a consistent snapshot. The execution of the entire system is modeled as a sequential state machine that traverses a sequence of consistent snapshots with timestamps. Specifically, consider an increasing timestamp sequence $T=\{t_0, t_1, \ldots\}$, where $t_i \in T$ is a timestamp for $i \in N$. The membership at timestamp t is the set that contains all living processes at t, denoted by M(t). For a process $p \in M(t)$, use Sp(t) to denote a local state at timestamp t. A consistent snapshot at t, denoted by $\pi(t)$, is a collection of local states from all living processes at t, i.e., $\pi(t) = U_p \in M(t) \; Sp_{(t)}$. Based on this information, the system states are a sequence of consistent snapshots, denoted by $\Pi = \{\pi(t), I=0, 1 \ldots\}$. The online predicate checker application program 106 checks distributed properties defined over global and consistent snapshots.

Since a global synchronous clock is not present in an asynchronous message passing system, as mentioned previously, the Lamport clock is used to construct the timestamps. The Lamport clock for timestamps orders all events in the system while preserving happens-before relationships. Every process exposes a local state independently when the state exposer 108 is triggered. Predicates are evaluated for timestamps when the snapshot is changed. Consequently, T in this model only contains the timestamps when a state exposer 108 is triggered. The snapshot is discussed in more details later and shown in FIG. 4.

Block 206 represents the verifiers collecting the states transmitted by the state exposer and evaluating the predicates. Block 206 evaluates the predicate against a runtime state of a node in the distributed system that is being checked. If the predicate evaluation 206 proceeds without any detections of performance bugs or failures, then the process flow may take a DOES NOT VIOLATE branch 208 to block 210 to indicate the evaluation had no violations, no performance bugs, or any performance issues.

Without loss of generality, predicates are defined as any functions defined over a finite number of consecutive snapshots. A number of consecutive snap-shots needed is called a window size of a predicate. Specifically, a predicate P with window size n is a function evaluated for every timestamp in T, $$P(t_i) = F(\pi(t_{i-n+1}), \pi(t_{i-n+2}), \ldots, \pi(t_i)) \text{ for some } n \geq 1,$$

where F is a user-specified function.

In this implementation, a critical lock consistency property is that at any time ti, there is no conflict between read and write locks. This property is checked by a predicate over the current snapshot, i.e., LockConsistency(ti)=F($\pi$(ti)) in which F checks whether $\forall l \in LockID$, the set $\{(c, l, m) \in \pi(t_i) | l=l, m=EXCLUSIVE\}$ contains at most one element. The function is implemented below:

```
Class LockVerifer : public Vertex< V1 > {
    virtual void Execute(const V0::Collection & snapshot) {
        std::map< LockID, int > exclusive, shared; // count the lock holders
        while ( ! snapshot.eof( ) ) {
```

-continued

```
// V0::Tuple is tuple type defined as (ClientID, LockID, LockMode)
V0::Tuple t = snapshot.get_next( );
If ( t.mode == EXCLUSIVE )
    exclusive[t.lock]++;
else shared[t.lock]++;
}
// check conflicts and add to "output" member of Vertex.
for (Iterator it = exclusive.begin( ); it != exclusive.end( ); ++ it)
    if ( it->value > 1 || (it->value == 1 && exist(shared, it->key) )
        output.add( V1::Tuple(it->key) );
}
static Key Mapping(const V0::Tuple & t) {// map states to key space
    return t.lock;
}
}
```

Shown above is a source code for a vertex V1 in the lock consistency predicate. Execute takes the exposed states (i.e., output of vertex Vo) as input, and is called once for every logic timestamp. The IDs for conflict locks are added to the output in vertex V1. Thus, LockConsistency is the predicate with window size 1. Predicates with multiple consecutive snapshots are useful when specifying historical properties.

This definition states that the predicate only depends on a recent time window of snapshots. Most useful properties only depend on a recent time window of snapshots, therefore the model is capable of expressing almost all properties in practice.

After collecting a set of consecutive and correct snapshots of a predicate's window size, the verifier 110 may always output a correct result. To construct a snapshot $\pi(t)$, the verifier 110 should know the membership M(t), and the local states Sp(t) for all p in M(t).

Because failures in processes could happen and change the membership, essentially the verifier relies on a failure detector to get M(t). The failure detector is modeled with a query interface, similar to most failure detector specifications. The verifier can query for any timestamp t in T, and the failure detector will eventually return a guess on M(t), denoted by M'(t), which could be incorrect. After M'(t) is obtained, the verifier waits until local states Sp(t) for all $p \in M'(t)$ are decided, and then constructs $\pi(t)$ as $U p \in M'(t) \; Sp(t)$ for checking. The verifier can decide Sp(t) either when receiving this directly or when the verifier receives two consecutive states Sp(t1) and Sp(t2) (t1<t<t2). In the latter case the verifier infers that Sp(t)=Sp(t1).

Figure 4:
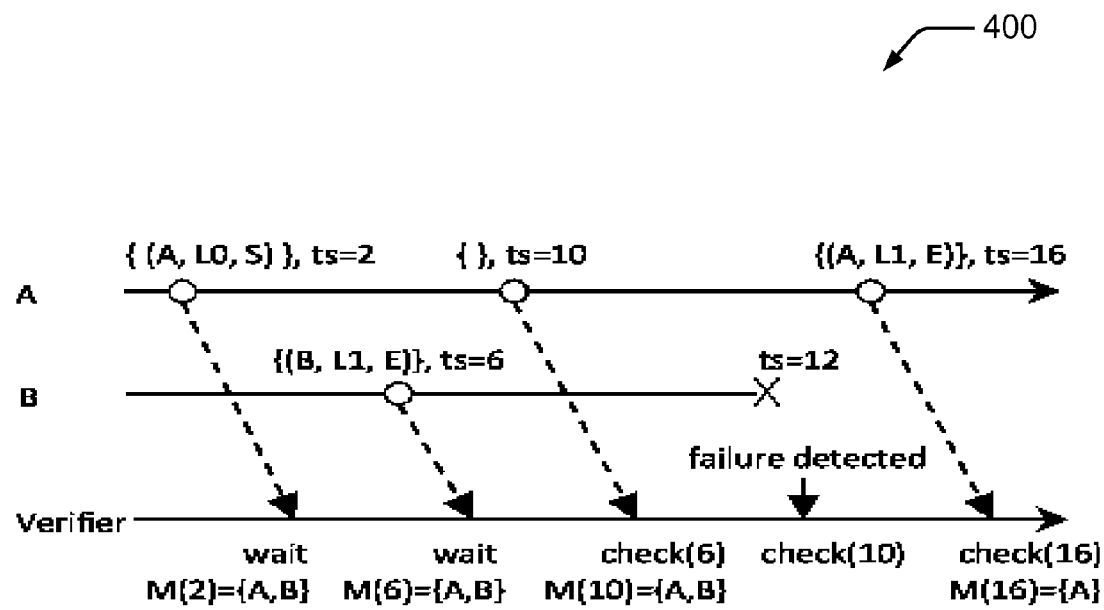
FIG. 4 is a block diagram of an exemplary snapshot with timestamps for the online predicate checker.

The state exposer in p periodically sends the current timestamp to the verifier. This heartbeat is used as both the failure detector and the notification of p's progress. As such, the verifier may receive the train of timestamps of the heartbeat intermixed with the exposed state from p. When computing $\pi(t)$, the latest received Sp(t1) is used as long as timestamp of p exceeds t. If the failure detector declares that p has crashed at t2 through heartbeat timeout, for all t between t1 and t2, $\pi(t)$ uses Sp(t1). From t larger than t2, all p's states are excluded. An implementation of the snapshot is shown in FIG. 4.

Returning to block 206, for the evaluation of whether there was a violation associated with the predicate. If the evaluation found violations of the predicates, performance issues, or performance bugs, the process flow may take a VIOLATE branch 212 to block 214 for the output violation report. The report contains particular predicate instance and the related states. Furthermore, the report may contain replay-enabling logs. Failures of various kinds are common in the distributed system.

Block 216 illustrates the process supports on-the-fly modification and installation of new predicates. As such, both false-positives and false-negatives (e.g. missing violation points) can occur.

Exemplary Directed Acyclic Graph

Figure 3:
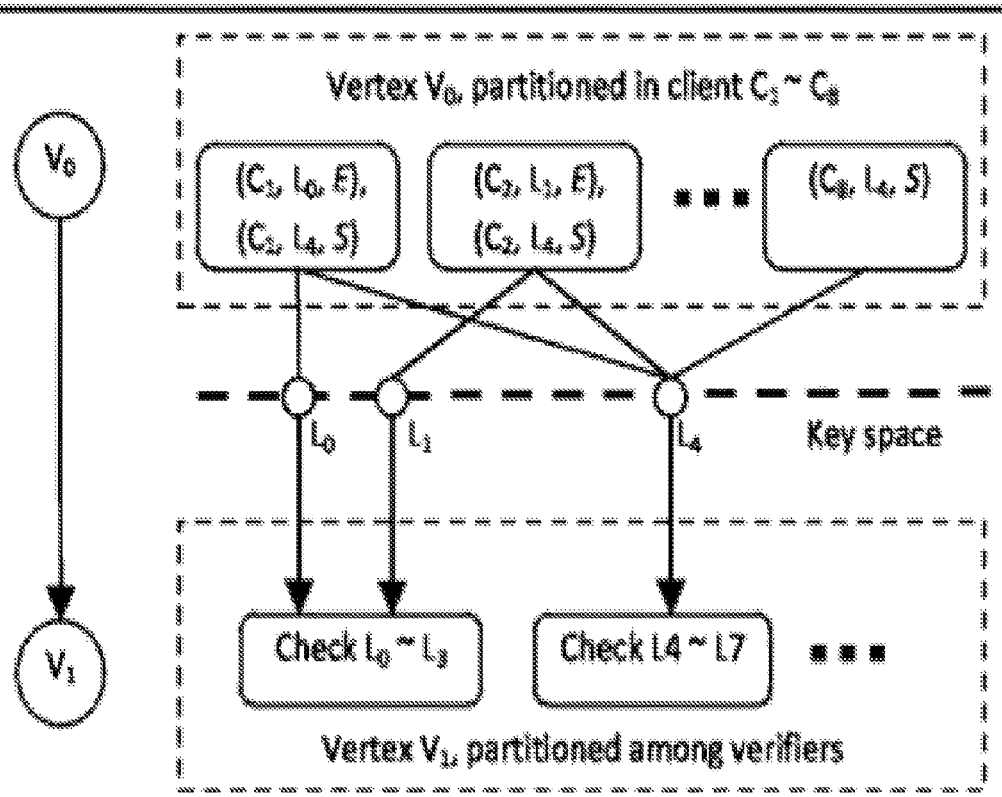
FIG. 3 is a block diagram of an exemplary directed acyclic graph (DAG) for a predicate.

FIG. 3 is an exemplary directed acyclic graph (DAG) 300 of the predicate. The DAG is shown on the left side and execution for the predicate is shown on the right side of FIG. 3. V0 is mapped to checked nodes, and V1 is mapped onto verifiers according to a lock field in output of V0.

Each vertex in DAG is a program that has one output and one or multiple inputs. The edges represent dataflow between the programs, connecting outputs of vertices to their down streaming vertices.

There is an initial vertex representing state exposers. The vertex outputs a new snapshot π(t) when a state exposer is triggered at timestamp t. According to a dataflow model, t is included in T for checking. Each of the other vertices is triggered to process timestamp t as long as the input data from upstreaming vertices are ready to construct a consistent snapshot for t. The vertex program is thus executed to generate output data, which is also labeled with t and transmitted to all down streaming vertices. When all vertices has executed for t, the predicate is evaluated for t, and gives the checking result from the output of the final vertex. Vertices may work on different timestamps simultaneously, thus parallelism in the predicate can occur due to the dataflow model.

Predicates are usually deterministically calculated from the exposed states. When failures happen in intermediate vertices, after recovery the online predicate checker application program 106 can reexecute the same timestamp from the initial vertex, and only the exposed states are required. This indicates a simple and effective way to deal with verifier failures.

The DAG 300 is compiled into a dataflow execution of multiple vertices, similar to a Dryad graph. A person of ordinary skilled in the art would be familiar with the Dryad graph. The DAG 300 is based on an observation that the dataflow model expresses a maximum degree of concurrency, and therefore allows dynamic scaling of the verifiers when required. When multiple machines are used, the computation is mapped to these resources in a manner similar to MapReduce. One critical optimization to reduce overhead is to implement streaming processing, in which only delta of states are transmitted and processed. This avoids redundant computation on unchanged states, therefore improving the performance.

The implementation shows one type of predicate that checks safety properties, a violation of which immediately reveals a performance bug. For liveness properties which should eventually be true, many times a violation only implies that the system is in fluctuating status, rather than a real bug. The online predicate checker application program 106 user can additionally specify a timeout threshold plus stability measures in the predicate to filter out false alarms in liveness violations.

A simple scripting language to specify a DAG is designed. The language describes the graph with the output data type of each vertex. From the scripts, a C++ code skeleton of predicates is generated, and developers need to specify the program of vertices in corresponding derived classes. This scripting language is shown below:

```
# scripts for constructing DAG
V0: exposer > {(pred: chordID, self: chordID, succ: chordID)}
V1: V0      > {(sum_range_size: int)}
V2: V1      > {(range_coverage: float)} as FINAL
```

Exemplary Partitioned Execution

Although the predicate is specified as a global function, the predicate evaluation can be partitioned across multiple machines as shown in FIG. 3. This gives the online predicate checker application program 106 good scalability. To ensure the correctness of checking when the evaluation is partitioned, the state tuples of the same lock should be checked together. This method is instructed by a simple Mapping function that maps tuples in Vo to a virtual key space. The key space is partitioned by multiple verifiers dynamically. States mapped to a key are checked by the verifier that takes the key. As a result, the first and the second verifier will check the predicate for lock 0>>5 and 6>>10, respectively.

The vertex can have multiple instances running on different verifiers, and the output of the vertex is the union set of outputs in all the involved verifiers. In this case, the verifier only evaluates a subset of input data for each timestamp. Using multiple verifiers is the key towards achieving scalability in the online predicate checker application program 106.

Developers specify how the output of the vertex is partitioned by an optional Mapping function. The partition is through a logical key space, similar to MapReduce. States are mapped to the key space and transmitted to the verifier that holds the key. The Mapping function is mainly used to specify constraints, i.e., which states should be checked together in the same verifier, as shown in the lock consistency predicate. If no such function provided, the online predicate checker application program 106 may use an arbitrary mapping. In this implementation, $v_1$ does not enforce any constraints, while V2 enforces with the mapping function that range sizes should be aggregated together.

During the execution, the online predicate checker application program 106 assigns the key space in each vertex to the verifiers. A notification mechanism makes sure that verifiers know the current key assignments of the downstreaming vertices, so as to transmit outputs to the verifiers that depend on the data correctly. If a verifier fails, the verifier is responsible input range will be taken over by other remaining verifiers. By changing the assignment of key spaces to verifiers on demand, the online predicate checker application program 106 is able to add and remove verifiers, or rebalance the jobs on verifiers.

Exemplary Snapshot of Lock Checking

FIG. 4 illustrates the memberships and snapshots of a lock checking implementation 400 in the distributed system. This figure illustrates a predicate checking for consistency of distributed locks. Process A and B are lock clients being checked The two processes A and B expose the states in the form of {(ClientID, LockID, Mode)} (E for EXCLUSIVE and S for SHARED). T is the sequence of timestamps and π(t) is the snapshot for timestamp t. Given a failure detector that outputs membership for every timestamp, the verifier may decide whether a complete snapshot is obtained for checking.

Process A and B expose states at disjoint timestamps {2, 10, 16} and {6}, respectively. Every exposed state is a set of (ClientID, LockID, Mode) tuples that represents all current locks the process holds.

If the process p exposes two consecutive states at timestamp $t_1$ and $t_2$ for any timestamp t between $t_1$ and $t_2$, $S_p(t)=S_p(t_1)$. For example, $S_A(6)=S_A(2)=\{A, L0, Shared\}$. Therefore, given $M(6)=\{A, B\}$, the snapshot $\pi(6)=S_A(6)$ u $S_B(6)=S_A(2)$ u $S_B(6)$.

As shown in FIG. 4, B exposes a latest state at timestamp 6 and then crashes at timestamp 12. Thus, $\pi(10)$ is $S_A(10)$ u $S_B(6)$ (after waiting for more than the timeout threshold for new state from B). $\pi(16)$, however, may exclude B since B has departed from the system.

As long as $M'(t)=M(t)$, the failure detector outputs correctly for timestamp t, then the corresponding snapshot may be constructed correctly. If the failure detector is inaccurate, then there can be both false-positives and false-negatives. In practice, this is reduced to tradeoffs between the checker's performance and accuracy. Also, when the predicate has not constructed a snapshot to output, the predicate may miss violations.

The verifier starts after B exposes SB(0), so the verifier is unable to construct $\pi(2)$. It is possible that a violation at timestamp 2 went undetected. For a predicate whose window size is n, the condition of outputting checking results is to collect n consecutive snapshots. This allows starting a new predicate at any time in the middle of system execution. This is a goal to achieve for both flexibility and failure tolerance.

Many times the snapshots of consecutive timestamps only have a small portion of changed states. When this occurs, transmitting and processing the entire snapshots at every timestamp is very inefficient. For this reason the online predicate checker application program 10 supports a streaming processing, in which vertex only transmits the difference in the output compared with the last timestamp, and only processes the difference of the input data and update the output incrementally. There is an optional ExecuteChange function to specify the logic for incremental processing. In an implementation, the function in V1 uses a last output value for unchanged states. Streaming processing avoids most of the redundant transmission and processing on unchanged states, therefore reduces the overhead in both state exposers and verifiers.

Besides streaming processing, sampling is also used to further reduce overhead. The sampled states may be checked in each vertex. To achieve checking, the online predicate checker application program 106 proceeds with the verifiers covering only a portion of the key space for some vertices. Therefore these vertices only process the states that are mapped to covered keys. In addition, the online predicate checker application program 106 checks sampled timestamps in T. This benefits from the fact that the model allows the online predicate checker application program 106 to stop and restart predicate checking in the middle of a system execution.

Exemplary Processing Functionality for Online Predicate Checker

Figure 5:
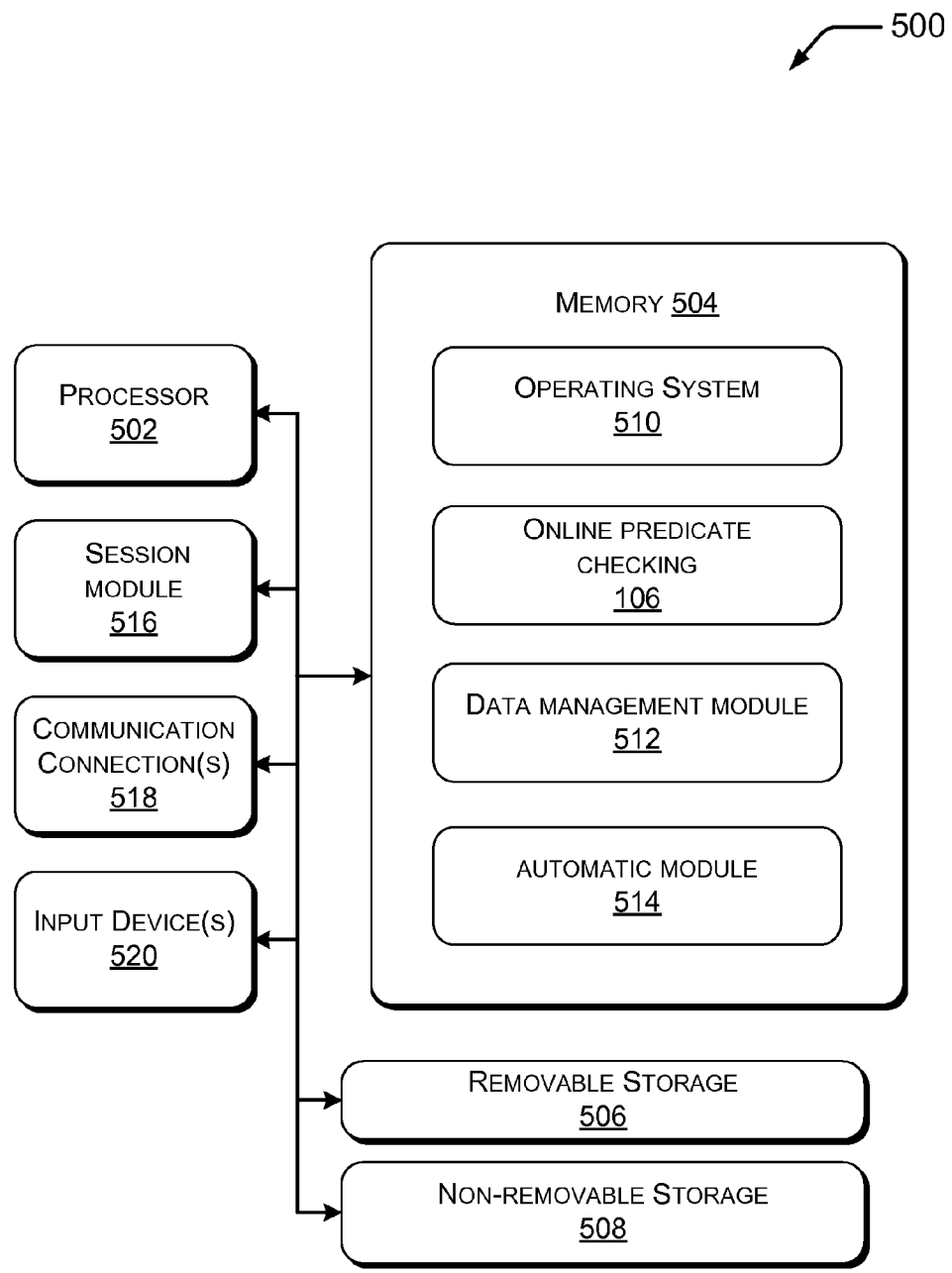
FIG. 5 is a schematic block diagram of an exemplary operating system for the online predicate checker.

FIG. 5 illustrates an exemplary processing functionality 500 to implement the online predicate checker application program 106. The processing functionality 500 may be configured as any suitable computing device or server capable of implementing the online predicate checker application program 106. In one exemplary configuration, the processing functionality 500 comprises at least one processing unit 502 and memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The server may also include additional removable storage 506 and/or non-removable storage 508 including, but not limited to, magnetic storage, optical disks, and/or tape storage. The disk drives and their associated computer-readable media may provide non-volatile storage of computer readable instructions, data structures, program modules, and other data for the computing devices.

Memory 504, removable storage 506, and non-removable storage 508 are all examples of computer storage media. Computer storage media includes volatile and non-volatile, removable and non-removable media implemented in any method or technology for storage of information such as computer readable instructions, data structures, program modules or other data. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 504 in more detail, may include an operating system 510, one or more application programs or service for implementing the online predicate checker application program 106. In one implementation, the memory 504 includes a manager module 512 and an automatic module 514. The manager module 512 includes but is not limited to identifying and tracking a runtime. The manager module 512 stores and manages storage of information, such as runtime states, session identifier, session state, computing devices of the user, and the like, and may communicate with one or more local and/or remote databases or services. The automatic module 514 may be used when the online predicate checker application program 106 operates to automatically collect comprehensive information.

The memory 504 further includes a session module 516. A user interface module presents the user with the user interface to log in or log off, in and out of a session, runtime, and the like. The session module 516 includes but is not limited to, tracking a state of the computing devices, logging in or logging off, connecting or disconnecting, and the like. The session module 516 performs connections, disconnections, search functions, such as performing searches to identify the client devices that are logged on, logged off, state of the client devices, the status of the user, and the like.

The processing functionality 500 may also contain communications connection(s) 518 that allow the processing functionality 500 to communicate with a stored database, another computing device or server, the user terminals, and/or other devices on the network. Communications connection(s) 518 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 500 may also include input device(s) 520 such as a keyboard, mouse, pen, voice input device, touch input device, etc., and output device(s) 528, such as a display, speakers, printer, etc. The processing functionality 500 may include a database hosted on the processing functionality 500 including, but is not limited to, session data, network addresses, list of computing devices 104, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for debugging a distributed system, implemented at least in part by a computing device, the method comprising:
   defining an online predicate checking by specifying a predicate on distributed properties of the distributed system;
   identifying dataflow, types of states, and how the states are retrieved;
   identifying a logic and a mapping function in each stage for the predicate;
   monitoring and checking the predicate when the distributed system is deployed and providing a service;
   detecting a non-trivial correctness or a performance bug when a violation of the predicate occurs;
   performing modifications of the predicate or installing new predicates in response to the violation; and
   modeling a distributed system as a sequential state machine with a sequence of snapshots and timestamps.

2. The method of claim 1, wherein defining the online predicate checking comprises automatically checking the distributed system upon deployment of the distributed system.

3. The method of claim 1, wherein the online predicate checking comprises programming to hide details of collecting and aligning runtime states, in order to program the predicate in a straightforward sequential programming style.

4. The method of claim 1, wherein the online predicate checking comprises evaluating the predicate against a runtime state of a node in the distributed system that is being checked.

5. The method of claim 1, further comprising representing the predicate by constructing a directed acyclic graph (DAG) of multiple vertices to allow for dynamic scaling.

6. The method of claim 1, further comprising representing the predicate by constructing a directed acyclic graph (DAG) of multiple vertices for efficient parallellism and pipelined implementation.

7. The method of claim 1, further comprising providing a violation report with replay-enabling logs when the violation occurs.

8. The method of claim 1, further comprising retrieving runtime states to construct the sequence of snapshots with the timestamp for a correct predicate evaluation.

9. The method of claim 1, further comprising collecting runtime states from different nodes that arrive in an arbitrary order and aligning received runtime states to construct consistent snapshots.

10. The method of claim 8, wherein detecting the performance bug comprises evaluating the predicate that is close to a root cause.

11. One or more computer-readable media comprising computer-executable instructions that, when executed, perform the method as recited in claim 1.

12. A computer-readable storage media comprising computer-readable instructions executed on a computing device, the computer-readable instructions comprising instructions for:
   accessing an online predicate checker model that is being deployed and providing a service for a distributed system;
   monitoring and evaluating a predicate against a runtime state of a node in the distributed system that is being checked;
   detecting a non-trivial correctness or a performance bug when a violation of the predicate occurs;
   performing modifications of the predicate or installing new predicates in response to the violation;
   modeling an execution of a distributed system as a sequential state machine; and
   collecting a sequence of a consistent snapshot with timestamps for each process, wherein the sequence contains the timestamps when observations of states are triggered by alerts.

13. The computer-readable media of claim 12, wherein the online predicate checking comprises a programming abstract that hides details of collecting and aligning runtime states, in order to program the predicate in a straightforward sequential programming style.

14. The computer-readable media of claim 12, further comprising partitioning by mapping a state tuple to a virtual key space.

15. The computer-readable media of claim 12, further comprising constructing a directed acyclic graph (DAG) of multiple vertices to allow for dynamic scaling, parallelism, and pipelined implementation.

16. The computer-readable media of claim 12, further comprising:
   collecting runtime states from different nodes that arrive in an arbitrary order;
   aligning received runtime states to construct a sequence of consistent snapshots; and
   running the online predicate checker for a correct predicate evaluation.

17. A system for detecting a performance bug, the system comprising:
   a processor;
   a memory coupled to the processor for detecting a performance bug;
   wherein the processor is configured for:
      developing an online predicate checker using predicates;
      collecting runtime states that are transmitted between one or more computing devices, implementing at least one of a service or an application in the distributed system;
      detecting a performance bug on the one or more computing devices based on collecting the runtime states, evaluating the predicates using the online predicate checker on the distributed system;
      performing modifications of the predicates or installing new predicates in response to detecting the performance bug; and
      modeling a distributed system as a sequential state machine with a sequence of snapshots and timestamps.

18. The system of claim 17, further comprising displaying an output of a violation of detecting the performance bug.

* * * * *